Patented Mar. 21, 1939

2,151,507

UNITED STATES PATENT OFFICE 2,151,507

PLASTIC COMPOSITIONS FROM POLYMERIZED VINYL COMPOUNDS

Hans Fikentscher and Gustav Hagen, Ludwigshafen-on-the-Rhine, Germany, assignors to I. G. Farbenindustrie Aktiengesellschaft, Frankfort-on-the-Main, Germany No Drawing. Application July 28, 1937, Serial No. 156,146. In Germany August 5, 1936

5 Claims. (Cl. 260—36)

The present invention relates to plastic compositions from polymerized vinyl compounds.

We have found that aromatic carboxylic acid esters of monoaryl ethers of polyhydric aliphatic alcohols are eminently suitable as softening agents for polymerized vinyl compounds.

As polymerized vinyl compounds there may be mentioned the polymerization products and interpolymerization products derived from vinyl chloride. The said softening agents are also suitable for the chlorination products of the said polymerized vinyl compounds, as for example for afterchlorinated polymerized vinyl chloride.

Suitable monoaryl ethers of polyhydric aliphatic alcohols are for example those phenyl, cresyl and xylenyl ethers of glycols, such as ethylene glycol, propylene glycol, diethylene glycol and polyglycols, and also of glycerine and polyglycerine the free hydroxyl groups of which are preferably all esterified. For the esterification of the free hydroxyl groups of the monoaryl ethers there may serve aromatic carboxylic acids, as for example, benzoic acid, phenylacetic acid or chlorinated aromatic carboxylic acids. The use of chlorinated acids for the esterification of the monoaryl ethers allows in many cases of improving the compatibility of the softening agents with the polymerized vinyl compounds.

More or less volatile softening agents are obtained depending on the nature of the monoaryl ethers and the nature of the aromatic carboxylic acids which are used for the esterification of the monoaryl ethers. In particular, the polyglycol and glycerine derivatives are distinguished by low vapor pressure and therefore yield artificial compositions very stable to ageing which undergo no loss in weight or only a negligible loss in weight even when stored at elevated temperature. The proposed softening agents also have the advantage that with polymerized vinyl compounds they yield products which are to a great extent stable to cold and which retain their extensibility and their other good mechanical properties even at comparatively low temperatures. The properties of the artificial compositions may frequently be considerably improved by using mixtures of the said softening agents with each other or with other softening agents. The working up of the softening agents with the polymerized vinyl compounds may be carried out in known manner by mixing, if desired with the addition of the usual solvents or swelling agents, with which the softening agents generally speaking have a good compatibility. The mixtures may also be homogenized by rolling or kneading, preferably at elevated temperature. In many cases it is advantageous to add the softening agents to the vinyl compounds before their polymerization.

The artificial compositions thus obtained may be further worked up by the usual methods, as for example by casting, rolling, pressing or spraying. They are suitable for example for the preparation of useful article of all kinds, as intermediate layers in the preparation of compound glass, as films, for sticking surfaces, for the preparation of cable compositions, artificial leather, oilcloth, and masses similar to linoleum. In many cases they are preferably worked up with other substances, as for example with stabilizers, fillers, pigments of all kinds, dyestuffs and fibrous materials.

The following examples will further illustrate how the present invention may be carried out in practice, but the invention is not restricted to these examples. The parts are by weight.

Example 1

By homogenizing 20 parts of polymerized vinyl chloride with 10 parts of the phenylacetic acid ester of glycerine ditolyl ether with an addition of 10 parts of alcohol, there are obtained after drying, rolling and pressing between polished plates while hot, very extensible, elastic foils which are stable to cold.

Instead of the phenylacetic acid ester of glycerine ditolyl ether there may also be employed advantageously the same amount of the benzoic acid ester of diethylene glycol monoxylenyl ether.

Example 2

60 parts of an interpolymerization product consisting of 80% of vinyl chloride and 20% of acrylic acid methyl ester are stirred with 15 parts of tricresyl phosphate and 17 parts of the phenylacetic acid ester of diethylene glycol monoxylenyl ether and the mixture is homogenized on hot rollers. By pressing between polished plates there are obtained clear, colorless and elastic foils which are distinguished by a specially good stability to cold.

By stirring 100 parts of an aqueous emulsion containing 35 parts of the same interpolymerization product with 9 parts of the benzoic ester of ethylene glycol monoxylenyl ether, there is obtained after evaporating the water a film having excellent properties.

Example 3

30 parts of a mixed polymerization product consisting of 80 per cent of vinyl chloride and 20 per cent of acrylic acid methyl ester are stirred with 20 parts of alcohol and 10 parts of the chlorbenzoic acid ester of ethylene glycol monochlorxylenyl ether and after drying, rolled to a foil on hot rollers. There are obtained from the foil by subsequent pressing elastic, clear foils of good extensibility, which show no brittleness in the cold.

Example 4

20 parts of a mixed polymerization product consisting of 95 per cent of vinyl chloride and 5 per cent of styrene are stirred with 10 parts of the phenylacetic acid ester of ethylene glycol monochlorxylenyl ether with the addition of 20 parts of alcohol. After drying, rolling and pressing while hot, clear foils free from creases are obtained which have a good stability to cold.

Example 5

20 parts of a mixed polymerization product consisting of 50 per cent of vinyl chloride and 50 per cent of styrene are homogenized with 10 parts of the chlorbenzoic acid ester of diethylene glycol monoxylenyl ether, rolled and pressed at elevated temperature. Foils of good extensibility and elasticity are obtained.

What we claim is:

1. Plastic compositions comprising a polymerized vinyl composition containing polyvinyl chloride and a softening agent selected from the group consisting of aromatic carboxylic acid esters of monoaryl ethers of polyhydric aliphatic alcohols.

2. Plastic compositions comprising polymerized vinyl chloride and a softening agent selected from the group consisting of aromatic carboxylic acid esters of monoaryl ethers of polyhydric aliphatic alcohols.

3. Plastic compositions comprising an interpolymerization product of vinyl chloride and another vinyl compound and a softening agent selected from the group consisting of aromatic carboxylic acid esters of monoaryl ethers of polyhydric aliphatic alcohols.

4. Plastic compositions comprising polymerized vinyl chloride and the benzoic acid ester of diethylene glycol monoxylenyl ether as softening agent.

5. Plastic compositions comprising an interpolymerization product of vinyl chloride and acrylic acid methyl ester and phenylacetic acid ester of diethylene glycol monoxylenyl ether as softening agent.

HANS FIKENTSCHER.
GUSTAV HAGEN.